US008160618B2

(12) United States Patent
Harris

(10) Patent No.: US 8,160,618 B2
(45) Date of Patent: Apr. 17, 2012

(54) METHOD FOR INCREASING SYSTEM CAPACITY AND WIRELESS DEVICE BATTERY LIFE BY SELECTION OF DELAY GAP BETWEEN QPC MESSAGE AND PAGE MESSAGE

(75) Inventor: John M. Harris, Glenview, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1109 days.

(21) Appl. No.: 11/747,976

(22) Filed: May 14, 2007

(65) Prior Publication Data

US 2008/0287145 A1 Nov. 20, 2008

(51) Int. Cl.
*H04W 68/00* (2009.01)

(52) U.S. Cl. .......................... 455/458; 455/90.2; 455/73

(58) Field of Classification Search .................. 455/558, 455/574, 509, 58, 73, 90.2; 370/329
See application file for complete search history.

(56) References Cited

U.S. PATENT DOCUMENTS

| | | | | |
|---|---|---|---|---|
| 2005/0049012 | A1* | 3/2005 | Chang et al. | 455/574 |
| 2005/0090270 | A1* | 4/2005 | Jou et al. | 455/458 |
| 2006/0160558 | A1 | 7/2006 | Kim et al. | |
| 2006/0194581 | A1* | 8/2006 | Kang et al. | 455/436 |
| 2006/0227753 | A1* | 10/2006 | Vleugels et al. | 370/338 |
| 2006/0246924 | A1* | 11/2006 | Balasubramanian et al. | 455/459 |
| 2007/0087767 | A1* | 4/2007 | Pareek et al. | 455/502 |
| 2007/0250726 | A1* | 10/2007 | Rossetti et al. | 713/320 |
| 2007/0259699 | A1* | 11/2007 | Homchaudhuri | 455/574 |
| 2008/0090594 | A1* | 4/2008 | Butler et al. | 455/458 |
| 2008/0220770 | A1* | 9/2008 | Qi et al. | 455/426.1 |
| 2009/0170535 | A1* | 7/2009 | Ryu et al. | 455/458 |
| 2010/0091720 | A1* | 4/2010 | Chun et al. | 370/329 |

* cited by examiner

*Primary Examiner* — Kamran Afshar
*Assistant Examiner* — Khawar Iqbal

(57) ABSTRACT

A method in a wireless communication system (100) dynamically updates paging gap times (314, 324) associated with a plurality of addresses (312, 322) of at least one wireless device (110) in a two phase paging system included in the wireless communication system (100). The method includes updating a first paging gap time (314) associated with a first address (312) of the at least one wireless device (110) in a two phase paging system, and updating a second paging gap time (324) associated with a second address (322) of the at least one wireless device (110), the second paging gap time (324) being different than the first paging gap time (314).

19 Claims, 6 Drawing Sheets

144

| 302 ADDRESS | 304 GAP TIME VALUE | 306 PAGING CYCLE | 308 GAP TIME SETTING CRITERIA |
|---|---|---|---|
| 312 A 1 | 314 GAP 1 | 316 PC 1 | 318 CRITERIA 1 |
| 322 A 2 | 324 GAP 2 | 326 PC 2 | 328 CRITERIA 2 |

METHOD FOR INCREASING SYSTEM CAPACITY AND WIRELESS DEVICE BATTERY LIFE BY SELECTION OF DELAY GAP BETWEEN QPC MESSAGE AND PAGE MESSAGE

FIELD OF THE INVENTION

The present invention generally relates to the field of wireless communications, and more particularly relates to a method for saving battery life on a wireless device in a wireless communication system and for increasing communication capacity in the system.

BACKGROUND OF THE INVENTION

Many battery powered wireless devices have a sleep, or idle, mode in which they are able to conserve power by powering down components such as their receivers. In the sleep mode, a communication unit is not on a traffic channel and it conserves power by periodically checking for incoming messages. These communication units then periodically "wake up" to determine if any page messages (pages) are being selectively transmitted to them. If there are no pages that the wireless device determines are destined for reception by the wireless device, it will power down in order to conserve power and extend its battery life. For example, Code-Division Multiple-Access (CDMA) cellular communication systems, more commonly referred to as CDMA 2000, 3GPP2 UMB (Ultra Mobile Broadband), or Wideband CDMA systems, also known as Universal Mobile Telecommunication System (UMTS), incorporate such power saving techniques. Each wireless device within a CDMA 2000 system is normally able to determine to which group of four, 20 millisecond (ms), synchronous frames on its paging channel (PCH) it is assigned. This group of frames, referred to as its "paging slot," is used by the infrastructure to transmit page messages to the particular unit. In other technologies, this is referred to as a superframe, and a first super frame conveys the QPC, an immediately subsequent super frame conveys the corresponding paging message. This configuration of the transmission of the QPC message followed by the page message is also referred to as a short paging gap or short gap. Thus, a communication unit in so-called "slotted mode" operation periodically exits its sleep mode in order to monitor transmissions associated with its assigned paging slot. The faster a communication unit can determine that it has no page message to receive, the faster it can return to sleep mode and conserve power, further extending its battery life.

In certain communication systems, such as CDMA 2000 & 3GPP2 UMB (Ultra Mobile Broadband), a Quick Paging Channel (QPCH) is incorporated to reduce the time a communication unit monitors the PCH slot for a page message. A QPC message is transmitted in the QPCH earlier than the corresponding page message transmitted in the PCH slot. Certain paging indicator bits are transmitted in the QPC message that tell each wireless device whether it is being selected for reception of a page message. Either the QPC message specifically selects the wireless device or it indicates that the wireless device may be selected by a subsequent page message transmitted in the PCH slot. Because the QPC message does not employ error correction coding or interleaving as does the page message transmitted in the PCH slot, the time required for a wireless device to receive and process its QPC message is small compared to the time required to monitor the longer page message in the PCH slot. Thus, the QPC message allows wireless devices to determine whether they need to monitor the upcoming corresponding page message transmitted in the PCH slot at all. Normally, a large number of wireless devices determine, based on the QPC message, that they do not need to monitor for the page message in the upcoming corresponding PCH slot and they can rapidly/immediately re-enter a "sleep mode," where battery power is conserved and battery life is extended.

The use of QPC message followed by a corresponding page message is an example of a two phase paging system that is included in certain wireless communication systems, such as in CDMA 2000, UMTS, and 3GPP2 UMB (Ultra Mobile Broadband), and in communication standards such as LTE 3GPP—(long-term evolution). During the first phase, a shorter more ambiguous message is sent to all wireless devices that are periodically monitoring for their selection by a transmitted page message. The purpose of this shorter and typically more ambiguous message (also known as a QPC message) is to quickly inform a large fraction of wireless devices that they are not the intended recipient of the page message. The remaining wireless device(s), which during the first phase is/are not sure if they are being paged, additionally monitor the information received in the second phase of the paging message. Based on the information in the second phase of the paging message, each of the remaining wireless device(s) can determine if it is being paged. The second phase of the paging message is not ambiguous. At this point, all wireless devices that are not being paged should be able to go to sleep. Wireless device that is being paged typically responds (such as by transmitting a handshake message back to the system) or performs a function dependent on the received QPC message or page message. Throughout this application, when the term QPC message is used, it is used to generally refer to the first phase of a two-phased page in any such two-phased paging system. When the term page message or PCH slot is mentioned, it is referring to the second phase of a two-phased page in any such two-phased paging system.

The time delay between the QPC message and the corresponding page message is known as the paging gap time or gap time. This gap time is a fixed time delay for all wireless devices in a communication system.

The delay time is set to allow wireless devices to conserve power by idle (power down) waiting for the time to monitor for the subsequent page message and while at the same time it allows a wireless device that determines from the QPC message that it is being selected for a page to quickly respond by, for example, transmitting a handshake message back to the system. In such a case, the system can avoid transmitting the subsequent page message because the system knows that the selected wireless device has already responded to the QPC message. Therefore, the time where the subsequent message would have been transmitted can be better used by the system to transmit other information to the wireless devices. This helps improve system capacity for more communications over the limited resource of the wireless communication channel.

Regrettably, using a fixed time delay for the gap time for all wireless devices in a communication system can result in a poor compromise that can detrimentally affect battery life for a large number of wireless devices in the system. Some wireless devices may need to have a short gap time and a short paging cycle, for example, repeatedly monitoring the wireless communication channel for page messages many times a second, because they need to respond quickly to a transmitted page. Other wireless devices that are not as time sensitive to responding to a transmitted page could have a much longer paging cycle, such as every five seconds. These wireless devices also could benefit from a longer gap time to conserve battery power while allowing one of these wireless devices to transmit the handshake message back to the system. Because all wireless devices will have to use the same short gap time that is fixed for all wireless devices in the wireless communication system, this timing constraint may result in a wireless device transmitting a handshake message back to the system after the end of the gap time. Therefore, it leaves no time for the system to avoid sending the subsequent page message resulting in wasted transmissions of the second page message. This reduces system communication efficiency and capacity.

Therefore a need exists to overcome the problems with the prior art as discussed above.

SUMMARY OF THE INVENTION

According to one embodiment of the present invention, a method is for dynamically updating paging gap times associated with a plurality of addresses of at least one wireless device in a two phase paging system included in a wireless communication system, the method comprising: updating a first paging gap time associated with a first address of at least one wireless device in a two phase paging system; and updating a second paging gap time associated with a second address of the at least one wireless device, the second gap time being different than the first gap time.

According to another embodiment, an information processing system dynamically updates paging gap times associated with a plurality of addresses of at least one wireless device in a two phase paging system included in a wireless communication system, the information processing system comprising: a memory; a processor, communicatively coupled to the memory; and a paging controller communicatively coupled to the memory and the processor, wherein the paging controller is adapted to: updating a first paging gap time associated with a first address of at least one wireless device in a two phase paging system; and updating a second paging gap time associated with a second address of the at least one wireless device, the second gap time being different than the first gap time.

In a third embodiment, a wireless device dynamically updates at least one paging gap time associated with at least one address of the wireless device in a two phase paging system included in a wireless communication system, the wireless device comprising: a memory; a processor, communicatively coupled to the memory; and a paging gap timing controller communicatively coupled to the memory and the processor, wherein the paging gap timing controller is adapted to: in response to the wireless device receiving an update message including rule-based paging gap timing criteria, updating at least one gap time value in the memory according to the rule-based paging gap timing criteria.

According to a fourth embodiment, a wireless device dynamically updates at least one paging gap time associated with at least one address of the wireless device in a two phase paging system included in a wireless communication system, the wireless device comprising: a memory for storing paging gap timing parameters corresponding to a plurality of addresses of the wireless device, the plurality of addresses being associated with a plurality of wireless communication functions of the wireless device, a first address of the plurality of addresses being associated with a first wireless communication function and with a first paging gap time and a second address of the plurality of addresses being associated with a second wireless communication function and with a second paging gap time; a processor, communicatively coupled to the memory; and a paging gap timing controller communicatively coupled to the memory and the processor, wherein the paging gap timing controller is adapted to: in response to the wireless device receiving at least one update message, updating at least one of the first paging gap time and the second paging gap time in the memory, the second paging gap time being different than the first paging gap time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with embodiments of the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term coupled, as used herein, is defined as connected, although not necessarily directly, and not necessarily mechanically.

The terms "wireless communication device" or "wireless device" are intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Figure 1:
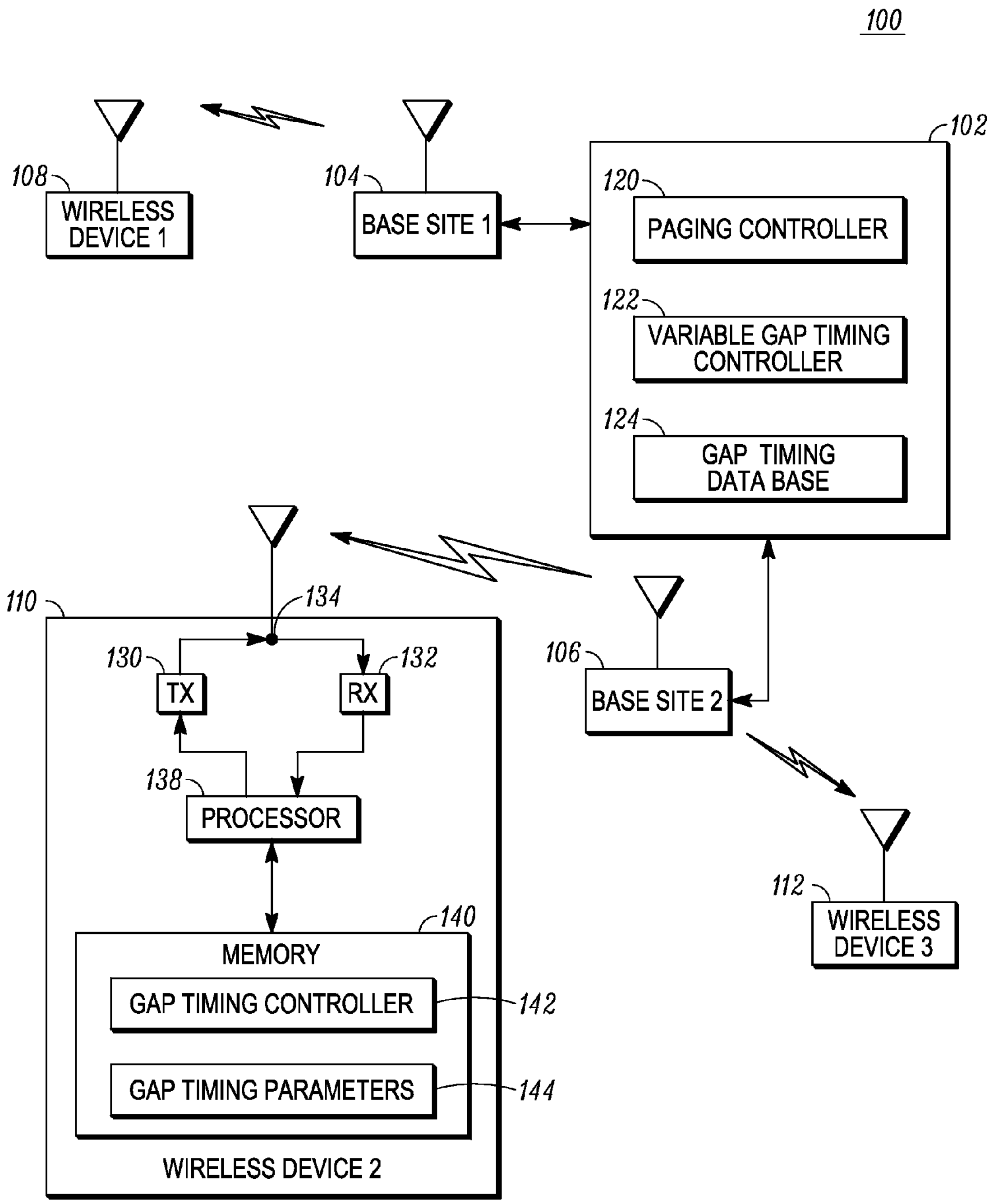
FIG. 1 is a block diagram illustrating a wireless communications system according to an embodiment of the present invention.

According to an embodiment of the present invention, as shown in FIG. 1, an example of a wireless communications system 100 is illustrated. FIG. 1 shows a wireless communications network that connects wireless communication devices 108, 110, 112, to each other or to one or more information processing systems 102. The wireless communications network, according to the present example, comprises a mobile phone network, a mobile text messaging device network, a pager network, or the like.

Further, the communications standard of the wireless communications network of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), IEEE 802.16 family of standards, Orthogonal Frequency Division Multiplexing (OFDM), Orthogonal Frequency Division Multiple Access (OFDMA), Wireless LAN (WLAN), WiMAX, or the like. Other applicable communications standards include those used for Public Safety Communication Networks including TErrestrial TRunked Radio (TETRA). Additionally, the wireless communications network also comprises text messaging standards, for example, Short Message Service (SMS), Enhanced Messaging Service (EMS), Multimedia Messaging Service (MMS), or the like. The wireless communications network also allows for push-to-talk over cellular communications between capable wireless communications devices.

The wireless network supports any number of wireless communication devices 108, 110, 112, which can be single mode or multi-mode devices. Multi-mode devices are capable of communicating on various access networks such as circuit services networks, packet data networks, and the like. The support of the wireless network includes, but is not limited to, support for mobile telephones, smart phones, text messaging devices, handheld computers, pagers, or the like. A smart phone is a combination of 1) a pocket PC, handheld PC, palm top PC, or Personal Digital Assistant (PDA), and 2) a mobile telephone.

More generally, a smartphone can be a mobile telephone that has additional application processing capabilities. In one embodiment, wireless communications network allows for mesh networking between the wireless communication devices 108, 110, 112. In one embodiment, the wireless network is capable of broadband wireless communications utilizing time division duplexing ("TDD") as set forth, for example, by the IEEE 802.16e standard. The duplexing scheme TDD allows for the transmissions of signals in a downstream and upstream direction using a single frequency. Another possible duplex scheme is Frequency Division Duplex, in which downstream and upstream communications can happen at the same time, but at different frequencies.

It should be noted that the present invention is not limited to an 802.16e system, or more generally a TDD system. Other such standards such as 3GPP (Long Term Evolution or UMTS-TDD version), 3GPP2 evolution, 802.20, Fourth Generation ("4G"), and the like are also applicable. The present invention is applicable to any wireless communication system 100 that transmits, among other things, broadcast information in a non-continuous manner and implements an idle mode period for wireless devices subscribing to the system.

The wireless system 100 also includes one or more base stations or base sites (also known as access nodes) 104, 106, and that include a base station controller ("BSC"). Each base station controller in a base site, in one embodiment, includes paging components that perform various paging functions and communicate with a paging controller 120 at a central information processing system 102.

The central information processing system 102 maintains and processes information for all wireless devices 108, 110, 112, communicating in the wireless communication system 100.

Additionally, the information processing system 102 also monitors and manages wireless device activity in the wireless network(s) included within the wireless communications system 100. In another embodiment, the information processing system 102 includes a paging controller 120. The paging controller 120, in one embodiment, controls, among other things, the paging functions such as paging slot cycles and wireless device wake-up times across various access networks of a specific paging group or for the wireless communications system 100. The function of the paging controller 120 is discussed in greater detail below. It should be noted that the paging controller 120 can reside at any information processing system communicatively coupled to the wireless communications network(s) of the wireless communications system 100.

Referring more specifically to the example of FIG. 1, a wireless communication system 100 includes an information processing system 102 that is communicatively coupled with a plurality of base sites 104, 106. Base site number 1 104 and base site number 2, 106 are shown in this example. Wireless communication devices, or wireless devices for short, such as wireless device 1 108, wireless device 2 110, and wireless 3 112, can be stationary or mobile across the various coverage areas of the base sites 104, 106, of the wireless communication system 100. The wireless devices 108, 110, 112, may also be referred to by other names such as mobile station, access terminal, subscriber unit, mobile phone, portable, smart phone, cellular phone, and many other names.

However, in general, these wireless communication devices, 108, 110, 112, are equipped with wireless receivers and optionally also with wireless transmitters such that the wireless communication devices can wirelessly communicate with the various base sites 104, 106, in the wireless communications system 100. In this example, as shown in FIG. 1, wireless device 1 108 is in wireless communication with base site number 1 104. Also, the second and third wireless devices 110, 112, are in wireless communication with base site number 2 106.

The information processing system 102 performs various management and control functions for the wireless communication system 100. The information processing system 102 is based upon a suitably configured processing system adapted to implement the embodiment of the present invention. For example, a personal computer, workstation, or the like, may be used.

One type of system management and control functions involves transmitting paging messages to a wireless device. Such paging messages can be used to select a particular wireless device within the wireless communication system to cause the selected wireless device to perform certain functions.

For example, a paging controller 120 in the information processing system 102 can cause a paging message to be transmitted from the information processing system 102 through one or more base sites, 104, 106, to try to locate one of the wireless devices 108, 110, 112, which may be roaming between the various base sites 104, 106. The transmitted paging message is destined for reception by the selected one of the wireless devices 108, 110, 112. The paging message includes address information that is specifically associated with the selected one of the wireless communication devices 108, 110, 112. When a wireless device receives and decodes the paging message the wireless device compares the address information of the paging message to predefined address information that is stored in the wireless device.

If the address information matches then the wireless device knows that it has been selected for that paging message and then performs the functions associated with the paging message. In certain wireless communication systems wireless devices, or also known as mobile stations, are selected at times to start a two-way wireless communication between the selected wireless device and a caller.

For example, in a cellular communication system a cellular telephone that may be roaming between various base sites may need to be located to start a telephone call with the user of the particular cell phone. To locate the cellular telephone the information processing system 102 transmits a paging message and expects a hand shake message transmitted from the selected mobile station or cellular telephone to locate the mobile station in one of the full coverage areas of the wireless communication system. Once the mobile station is located the system can start the two-way wireless communication with the located mobile station to connect the telephone caller with the located cellular telephone.

In modern wireless communication systems, such as illustrated in FIG. 1, there can be large numbers of wireless devices that are operating in the wireless communication system 100. Maintaining the longest possible battery life for the wireless devices or mobile stations is important. Since these wireless devices 108, 110, 112, need to know when they are being selected by a particular paging message, each wireless device periodically turns on it's receiver to monitor for wireless transmission of a paging message.

As shown in FIG. 1, wireless device 2 110, illustrates some of the components of a wireless device 110, as an example. A receiver 132 and a transmitter 130 are communicatively coupled to an antenna such as via a TX/RX switch 134. A processor 138, among other things, controls the receiver 132 and the transmitter 130 to turn on or off the respective receiver 132 or transmitter 130. The processor 138 is communicatively coupled to memory 140 in the wireless device or mobile station 110. Other typical components of the wireless device 10 are omitted from FIG. 1 and will not be discussed for succinctness and clarity of the discussion.

The memory 140 includes program memory that can store program components that provide instructions for the processor 138. One such program component is shown as a gap timing controller 142, which will be discussed in more detail further below.

Additionally, the memory 140 includes data memory with which the processor 138 can access data stored in the memory 140. One example of such data is shown as gap timing parameters 144, which will also be discussed in more detail below.

The information processing system 102 includes program memory that stores program components used by one or more processors or controllers of the information processing system 102. In such program memory, for example, a paging controller software module 120 and a variable gap timing controller software module 122 are stored. The function of these components of the system 102 will be discussed in detail below.

The information processing system 102 also includes data memory that stores data accessible to the processor/controller of the information processing system 102. In this example, a gap timing data base 124 is shown stored in data memory. The structure and use of such data base 124 will be discussed in detail below.

Figures 2, 3:
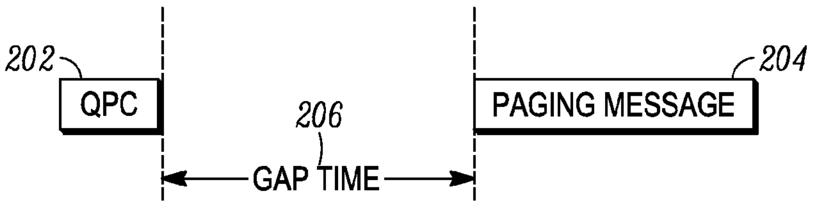
FIG. 2 is a timing block diagram illustrating a variable gap time delay between a QPC message and a subsequent corresponding page message, according to an embodiment of the present invention.
FIG. 3 is a table illustrating gap timing parameters in a wireless communication device according to an embodiment of the present invention.

In certain wireless communication systems 100, to help improve battery life for the wireless devices 108, 110, 112, the system 102 will first transmit a shorter paging message 202, such as shown in FIG. 2, to allow most of the wireless devices 108, 110, 112, to determine that they are not the intended target of the paging message 202 and thereby can more quickly turn off their respective receivers 132 and conserve battery power.

Since wireless devices 108, 110, 112, typically spend most of their time periodically turning on their respective receiver 132 to monitor for such a paging message 202, it is desirable to shorten as much as possible the paging message 202 thereby allowing most of the unselected wireless devices to quickly turn off their receiver 132.

However, where one or more of the wireless devices cannot determine whether they are being selected from the shorter paging message 202 (which may include only a subset of the full address of the target wireless device), then these wireless devices wait a certain predefined time interval in idle mode and then monitor again for a system transmitted paging message 204 that includes the complete address information, and possibly additional information, of the selected wireless device. This second page message can be more accurately and reliably received and decoded by the selected wireless device.

This timed interval between the first smaller paging message 202 and the second full paging message 204 is also called a paging gap time (or gap time) 206, as shown in FIG. 2. The first short paging message 202, in some systems is also called a QPC message (QUICK PAGING CHANNEL message). The gap time 206 serves to give time for a selected wireless device to transmit a hand shake message back to the information processing system 102, and thereby the information processing system 102 can avoid transmitting the second paging message 204.

Each wireless device is configured for a certain gap time 206 between the QPC message 202 and the subsequent second paging message 204. While it is desirable to allow the gap time 206 to be long enough to facilitate transmission of the hand shake message from a selected wireless device to avoid transmitting the subsequent paging message 204, and thereby allowing other information to be transmitted during that time, if the gap time 206 is too long then certain types of wireless devices may not operate properly or as intended.

For example, a PTT mobile station wants to have a relatively short gap time 206 and monitors the wireless communication channel very often to determine whether it is selected by a QPC message 202. On the other hand, a telephony mobile station periodically monitors the wireless communication channel much less often than the PTT mobile station and can benefit from a much longer gap time 206.

Unfortunately, current systems use a fixed gap time 206 for all wireless devices in a particular wireless communication system 100. This fixed gap time 206 is a compromise time that can detrimentally affect the battery life of certain wireless devices. Moreover, a short gap time 206 may not allow enough time for a selected wireless device to transmit the hand shake message back to the system to allow the system time to avoid transmitting the subsequent paging message 204. In such a case, channel throughput and system capacity are negatively impacted.

According to an embodiment of the present invention, this gap time 206 can be configured by the system to be a different gap time 206 for different addresses of the wireless devices.

Each address of a wireless device can be configured by the system to optimize performance of both the particular wireless device and the wireless communication system. For those devices that need a shorter gap time 206 they can be configured to the shorter gap time value, while those devices that can benefit from a longer gap time 206 will be configured by the system to a longer gap time value.

Each wireless device includes in data memory the gap timing parameters 144, such as illustrated in the example of FIG. 3 in a table data structure. For each address 302 a gap current value 304 will be stored and a paging cycle value 306 will also be stored. The paging cycle value 306 (also known as the paging interval) is the time interval for the wireless device to periodically monitor (i.e. turn on its receiver 132) and look for a QPC message 202. For example, for a PTT mobile station the paging cycle may be 200 ms while for a telephony mobile station the paging cycle is typically much longer, such as 5 seconds.

Additionally, the gap time setting criteria 308 may be optionally stored in data memory and associated with particular address information 302. This gap time setting criteria 308 will be discussed in more detail below. As shown in FIG. 3, a first address 312 is associated with a first gap time value 314, a first paging cycle time value 316, and a first criteria 1 318. Similarly, a second address 322 is associated with a second gap time value 324, a second paging cycle time value 326, and a second criteria 328. This particular wireless device 110 with the gap timing parameters 144 as shown in FIG. 3 can be selected by a plurality of addresses, each address being specifically configured for its paging cycle time value 306 and gap time value 304.

Figure 4:
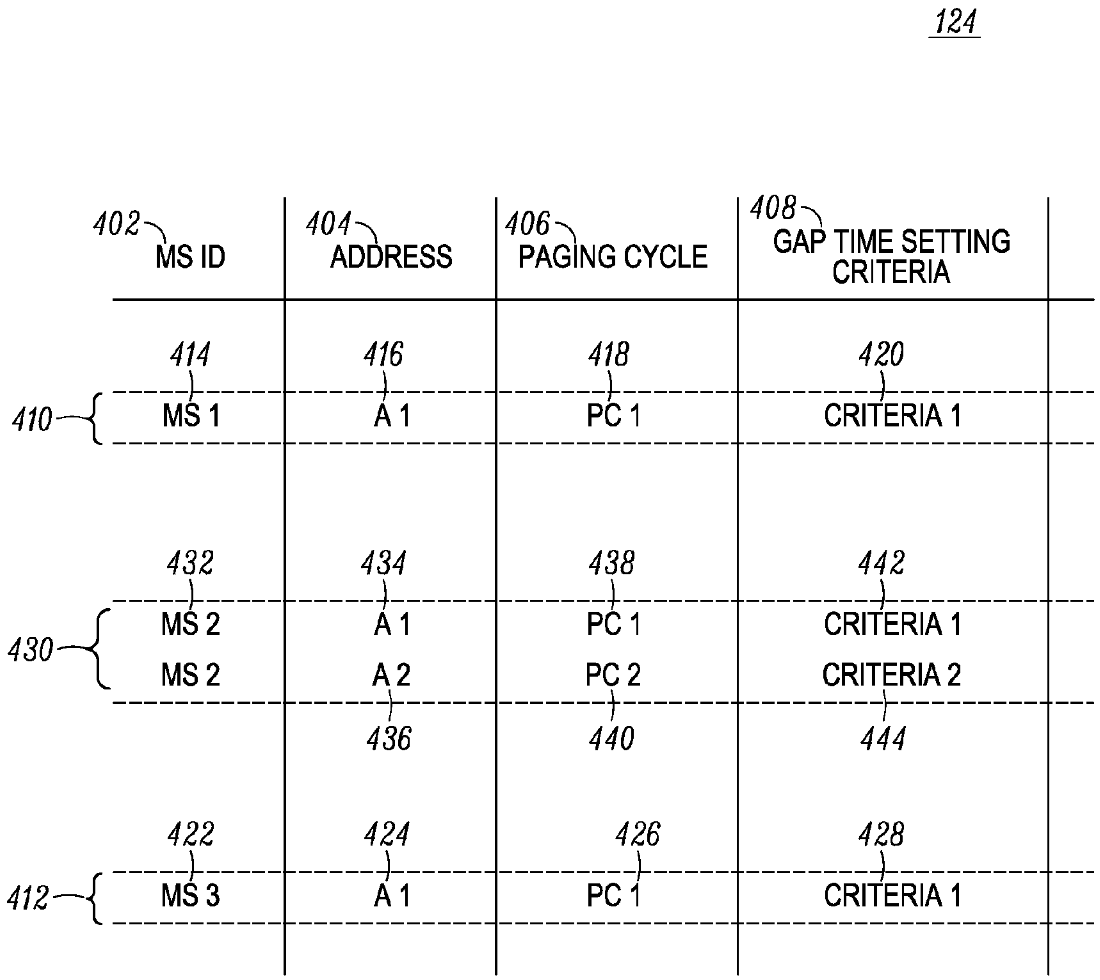
FIG. 4 is a table illustrating a gap timing database for a wireless communication system according to an embodiment of the present invention.

An example of a gap timing data base 124 is shown in FIG. 4, illustrated as a table where the rows represent the records stored in the data base and the columns represent the fields of the particular record. This is only an example. Each record in the data base 124 contains a mobile station id field 402, an address field 404, a paging cycle field 406, a gap time setting criteria field 408, and possibly more fields and information.

In this example, the mobile station id 402 identifies the wireless device to the wireless communication system 100. The address information 404 identifies a particular address and function in the wireless device. The paging cycle 406 indicates the time delay between the times when the wireless device turns on its receiver and monitors the wireless communication channel for the QPC message. This paging cycle 406 can vary between different types of wireless devices as well as different types of communication functions for a particular wireless device.

For example, a telephony mobile station that receives telephone calls may utilize a paging cycle of 5 seconds. That is the telephony mobile station monitors the wireless communication channel every 5 seconds for the QPC message.

Alternatively, a PTT mobile station may use a paging cycle of 200 ms. A PTT mobile station therefore monitors the wireless communication channel 5 times per second for the QPC message.

Lastly, the gap time setting criteria 408 defines the gap time configuration for each address of a mobile station. In a single address mobile station, such as indicated for the first record 410 and the third record 412, as shown in FIG. 4, the paging cycle 406 and the gap time 408 are defined for the mobile station. In the first record 410, mobile station 1 414 has single address A1 416 with a paging cycle PC 1 418 and gap time criteria 1 420. In the third record 412, mobile station 3 422 has address 1 424, paging cycle 1 426 and gap time setting criteria 1 428.

As indicated by the second record 430, mobile station 2 432 is associated with a first address 434 and a second address 436, a first paging cycle 1 438 associated with the first address 434, and a second paging cycle 440 associated with the second address 436.

Additionally, a gap time setting criteria 1 442 is associated with the first address 434 and a gap time setting criteria 2 444 is associated with the second address 436. In this example, therefore, the second record 430 includes 2 sub-records for the mobile station 2 432, each sub record associating a particular address in the mobile station, a respective paging cycle 406 and gap time setting criteria 408. The mobile station associated with the second record 430, for example, can have a PTT mobile station function for address 1 434 and a telephony mobile station function for address 2 436.

The gap time setting criteria 408 identifies how to set a gap time for a particular address in a mobile station. In one case, the gap time setting criteria defines a constant value for gap time. For example, for the second record 430 address 1 434 can be mapped with a PTT function and have a gap time of 40 ms 442. Also, address 2 436 can be associated with a telephony mobile station function and it's gap time setting criteria 444 may be set at 100 ms.

Other types of gap time setting criteria 408 may be stored in the particular records associated with mobile stations. For example, the first record 410 may include a gap time setting criteria 420 defining a rule for how the mobile station 1 will set its gap time value. The criteria 420 for the first record 410 can define a rule that can be transmitted to the mobile station 1 to instruct the mobile station 1 to configure its gap time value based on the rule 420. In similar fashion the third record 412 associated with mobile station 3 as indicated by its ID 422 can include a gap time setting criteria 428 with a rule that is transmitted to the mobile station 3 to instruct it to set its gap time value according to the rule 428.

As indicated in the second record 430, mobile station 2 can receive a gap time setting criteria rule 442 for its first address 434 and a criteria rule 444 for its second address 436. The gap time setting criteria 408 defined as rules 420, 442, 444, 428, allow significant flexibility in a wireless communication system 100 to define variable gap time values for the various addresses of the mobile stations 108, 110, 112, in the wireless communication system 100.

For example, a rule can be set for all of the gap time setting criteria 420, 442, 444, and 428. This rule will be transmitted to all of the mobile stations in the system 100. The rule criteria defines a first gap time value for addresses in mobile stations associated with paging cycle times that are less than 2 seconds, while defining a second gap time value for addresses in mobile stations associated with paging cycle times greater than or equal to 2 seconds. In this way, for example, PTT mobile station functions that have short paging cycles can have associated with them a short gap time value, such as 40 ms, and at the same time telephony mobile station functions, typically having paging cycle times greater than 2 seconds, can have associated with them longer gap time values, such as 100 ms. This rule criterion, as discussed above, is just one example of the flexibility of using a rule for gap time setting criteria 408.

Additionally note that this rule-based criteria works with wireless communication systems where the wireless device (or mobile station) has a paging cycle (or paging interval) that automatically updates after a predetermined interval of time following an event, and without any explicit messaging with the network at the time of the paging cycle (or paging interval) change.

In other words, for example, in the case where the paging interval is initially shorter after a user of the wireless device (or mobile station) 110 completes a call, the paging gap time would be smaller. However, after a predetermine long interval of time where there are no calls received by the mobile station 110, the mobile station 110 internally updates its paging interval time (paging cycle time) to be longer, and at that point, the mobile station 110 internally updates its gap time automatically to a larger gap time value. In similar fashion, the system 102 updates the appropriate record in the gap time data base 124 that is associated with the wireless device (or mobile station) to update the paging cycle time to be longer and the gap time to be a larger gap time, corresponding to the same values that are internally updated in the wireless device 110. These updates of the gap time at the system 102 and at the wireless device 110 are done without transmitting messages at the time of the update.

Another criterion is the size of the mobile's paging area or registration distance. If the mobile is in a small registration zone (with a small registration radius, for example) then it may be less important to reduce the paging load on that mobile—in which case a short gap time may be used.

In another embodiment, for example, the mobile 110 always monitors for a short gap time. However, the system 102 uses an "infinite" gap time the first time it attempts to page the mobile 110 (i.e., the system 102 sends the QPC message to the mobile 110 and does not send the corresponding page message to the mobile 110). If there is no response from the mobile 110, then after the next paging interval, the system 102 uses the short gap time to transmit the QPC message to the mobile 110, immediately followed by transmitting the paging message to the mobile 110. This allows the system 102 to avoid sending the paging message, if the mobile can decode the first QPC message and is willing to send a handshake message back to the system 102 in response to the QPC message. Some mobiles may not respond to the QPC message, so when the system re-pages the mobile, it transmits both the QPC message and the page message with a short gap time.

In one alternative embodiment, the system 102 can use rule-based criteria to determine the setting of the length of the gap time. If the system 102 determines that the QPC message is addressing a particular large number of mobiles, then it is less likely that the selected mobile will respond to the QPC message. As a result, in this case, the system 102 will transmit the QPC message and the page message the first time, with a short gap, instead of an infinite gap time as described above. In contrast, if the system 102 detects that the QPC message is addressing a particularly small number of mobiles, such that the QPC message should be relatively unambiguous, and the selected mobile would likely respond to the QPC message, then the system 102 will use an infinite gap time between the QPC message and the page message on the first page attempt—as originally described above.

Figure 5:
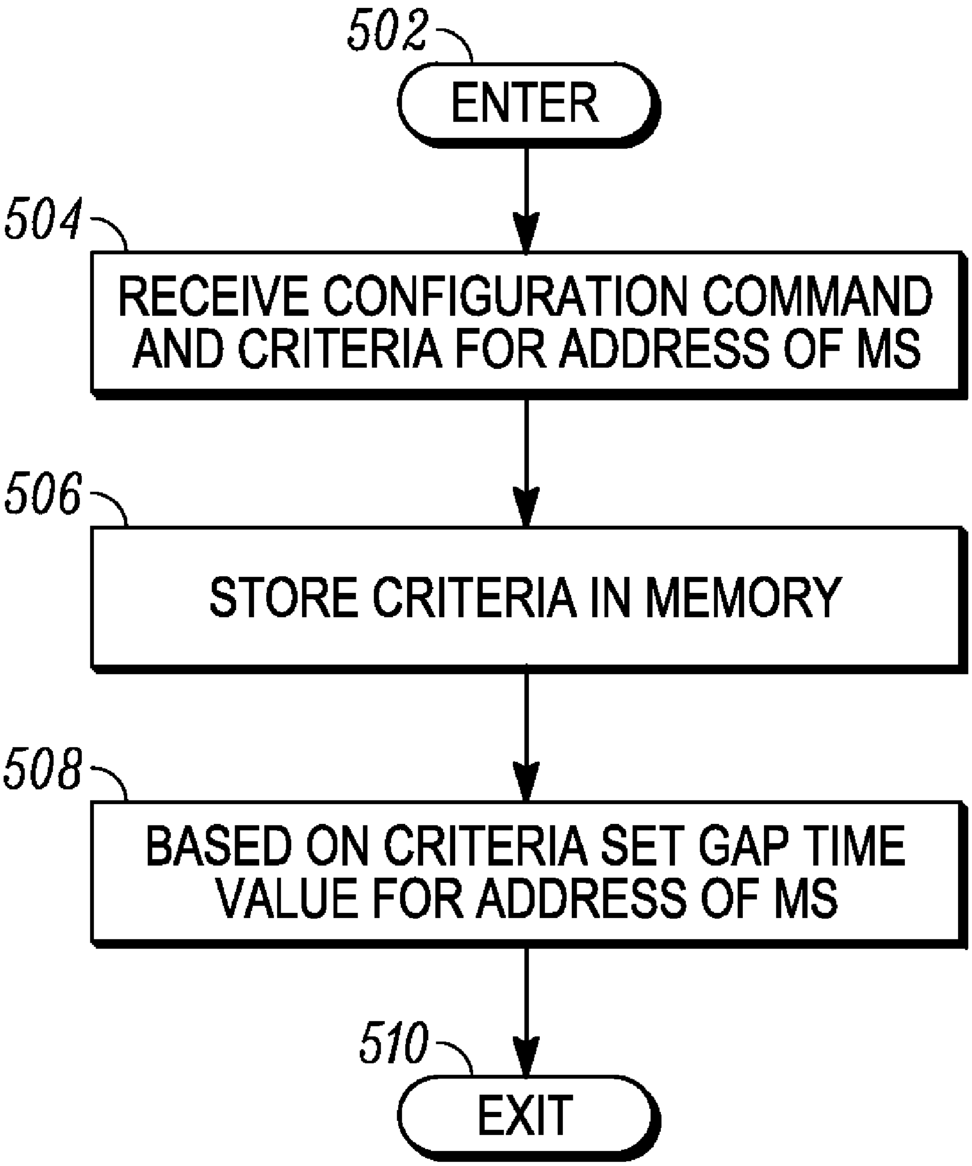
FIG. 5 is an operational flow diagram illustrating a gap timing parameters configuration process with a wireless device according to an embodiment of the present invention.

FIG. 5 is an operational flow diagram for a mobile station, illustrating an example of how a system can configure the gap timing parameters 144 for the mobile station 110. The mobile station 110 receives a configuration command and gap time setting criteria for an address of the mobile station, at steps 502, 504. The mobile station 110 then stores a received criteria in its memory 140, at step 506.

Then, at step 508, based on the received criteria the mobile station 110 sets the gap time value for a particular address of the mobile station in the gap timing parameters 144, and then exits the operational sequence, at step 510. As has been discussed above, the criteria can indicate to the mobile station 110 to set a constant gap time value for a particular address of the mobile stations in the gap timing parameters 144. Alternatively, the criteria can provide a flexible rule instructing the mobile station 110 on how to set the gap time value in the gap timing parameters 144.

Figure 6:
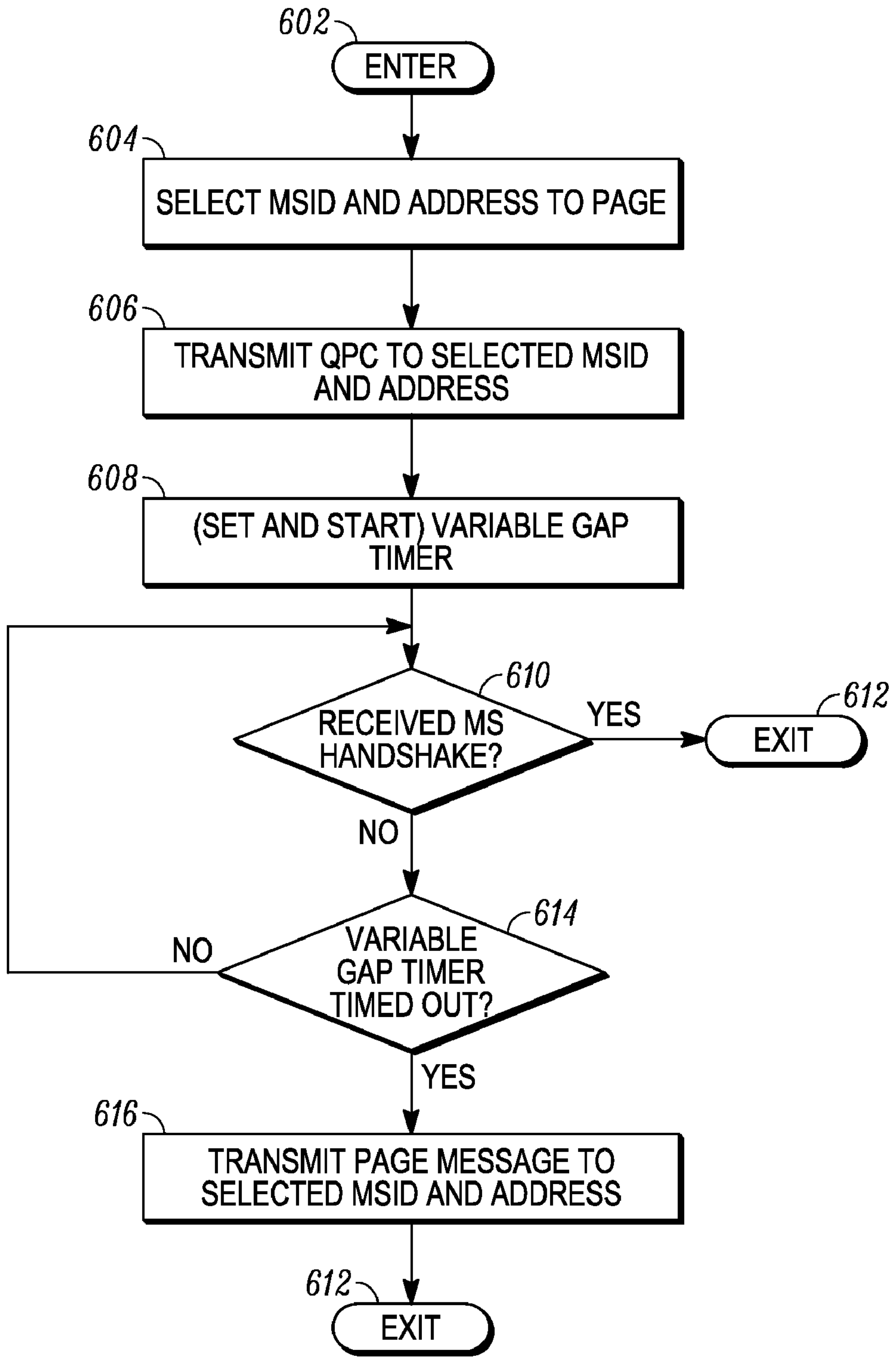
FIG. 6 is an operational flow diagram illustrating a variable gap timing process for a wireless communication system according to an embodiment of the present invention.

FIG. 6 is an operational flow diagram illustrating one example of how the variable gap timing controller 122 in the information processing system 102 can operate with paging controller 120 and the gap timing data base 124. In this example, the paging controller 120 selects a mobile station ID and address to page, at steps 602, 604.

The paging controller 120 then transmits the QPC message to the selected mobile station ID and address, at step 606. Then, the variable gap timing controller 122 sets and starts the variable gap timer, at step 608. The variable gap timing controller 122 looks up the appropriate gap timer value in the gap timing data base 124. Since the variable gap timing controller 122 detects that the mobile station hand shake message has been received, at step 610, then it exits, step 612, the operational sequence.

While the variable gap timer has not timed out, at step 614, the variable gap timing controller 122 repeatedly monitors for an indication that a mobile station hand shake message has been received, at step 610. If the variable gap timer has timed out, at step 614, then the variable gap timing controller 122 signals the paging controller 120 to transmit the page message to the selected mobile station ID and address, at step 616, and then exits the operational sequence, at step 612.

Figure 7:
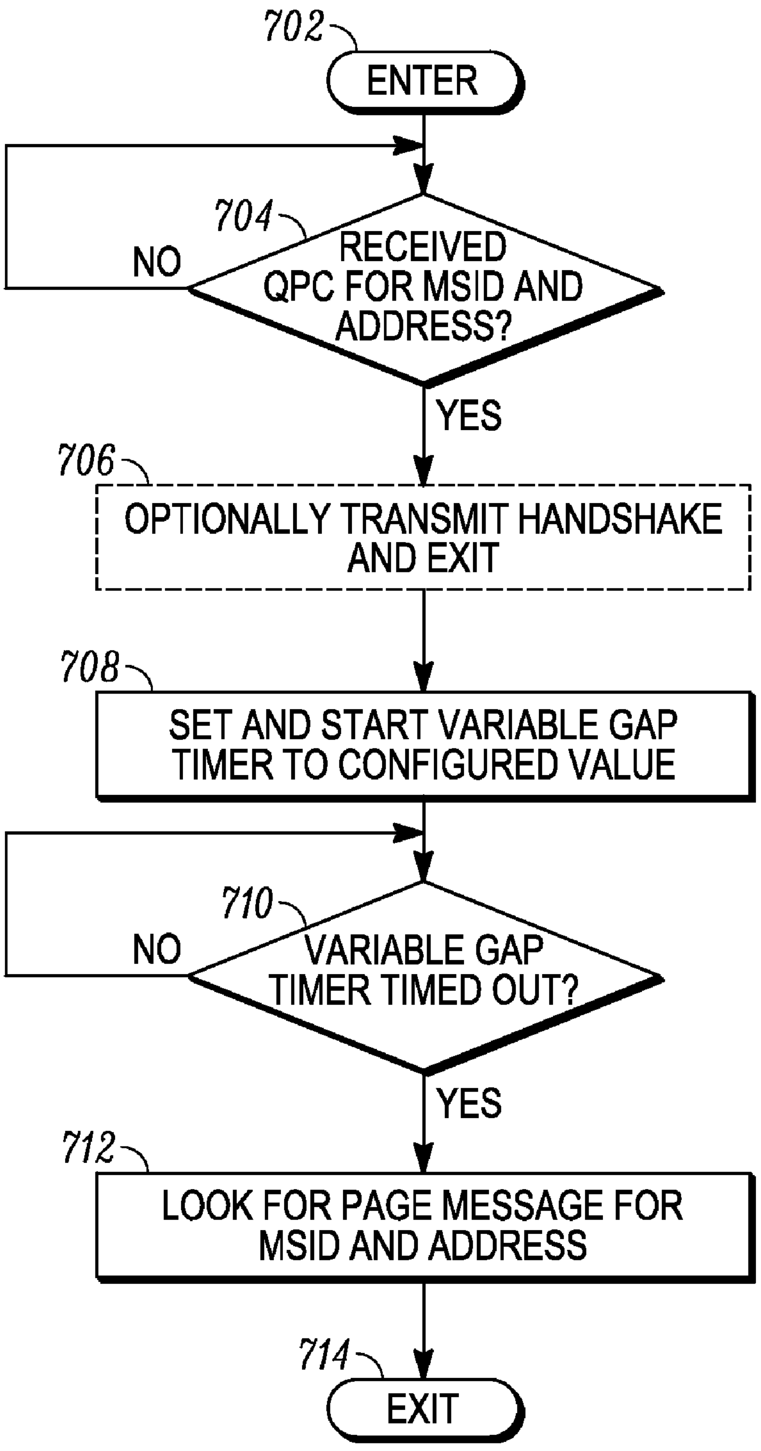
FIG. 7 is an operational flow diagram illustrating a variable gap timing process with a wireless device in a wireless communication system according to an embodiment of the present invention.

FIG. 7 is an operational flow diagram illustrating the gap timing controller 142 in the second mobile station 110 monitoring for the QPC message and then possibly also monitoring for the subsequent page message. After entering the operational sequence, at step 702, the processor 138 monitors the wireless communication channel by periodically turning on the receiver 132 to look for the QPC message that selects a particular address for the mobile station, at step 704.

If the QPC message is received, at step 704, then the processor 138 optionally may transmit a hand shake message back to the information processing system 102 and exit the operational sequence, at step 706. The processor 138 transmits the hand shake message when it has reliably detected that it is the target mobile station for the QPC message, at step 706.

However, if the processor 138 does not reliably determine that the QPC message is destined for reception by the mobile station 110, then the processor 138 and the gap timing controller 142 set and start a variable gap timer to the configured gap time value, at step 708. The gap time value is retrieved from the gap timing parameters 144. The gap timing controller 142 then waits for the variable gap timer to time out, at step 710, and then the processor 138 looks for the page message destined for reception by the mobile station at the particular address, at step 712, and then exits the operational sequence, at step 714.

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature used herein is used merely for convenience and to illustrate one example, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for dynamically updating paging gap times associated with a plurality of addresses of a wireless device in a two phase paging system included in a wireless communication system, wherein the two phase paging system comprises a first phase for transmitting a short paging message and a second phase for transmitting a full paging message wherein the full paging message is transmitted after delay of a paging gap time from the short paging message, the method comprising:

setting a first paging gap time for a first address of the wireless device, the first address being mapped to a first function in the wireless device;

setting a second paging gap time for a second address of the wireless device, the second address being mapped to a second function in the wireless device;

updating the first paging gap time associated with the first address of the wireless device; and updating a second paging gap time associated with a second address of the wireless device, the second paging gap time being different than the first paging gap time.

2. The method of claim 1, wherein the first address is associated with a PTT function in the wireless device and the second address is associated with a telephony function in the wireless device.

3. The method of claim 2, wherein the wireless device comprises a plurality of wireless devices, and wherein the first address is associated with a PTT function in a first wireless device of the plurality of wireless devices and the second address is associated with a telephony function in a second wireless device of the plurality of wireless devices, the second wireless device being different than the first wireless device.

4. The method of claim 2, wherein the first paging gap time associated with the first address is smaller than the second paging gap time associated with the second address.

5. The method of claim 1, wherein a first paging cycle time is associated with the first address, and wherein the first paging gap time is updated to a first value if the first paging cycle time is greater than a predefined threshold and otherwise the first paging gap time is updated to a second value different than the first value.

6. The method of claim 5, wherein the first value is greater than the second value.

7. The method of claim 1, wherein the updating of the first paging gap time comprises:

transmitting an update message to the wireless device.

8. The method of claim 7, wherein the update message includes at least one page gap time setting criteria.

9. The method of claim 1, wherein the updating of the first paging gap time comprises:

updating a database record, that is associated with the wireless device, with the first paging gap time.

10. The method of claim 1, wherein the first paging gap time is updated to an infinite paging gap time and the second paging gap time is updated to a finite paging gap time, and the first address and the second address are the same.

11. The information processing system of claim 10, wherein the updating of the first paging gap time comprises:

transmitting an update message destined for reception by the wireless device.

12. The information processing system of claim 10, wherein the memory includes a page gap timing data base that includes a plurality of records corresponding to a respective plurality of addresses associated with the wireless device, and wherein the updating of the first paging gap time comprises:

updating a database record, that is associated with the wireless device, with the first paging gap time.

13. An information processing system for dynamically updating paging gap times associated with a plurality of addresses of a wireless device in a two phase paging system included in a wireless communication system, wherein the two phase paging system comprises a first phase for transmitting a short paging message and a second phase for transmitting a full paging message wherein the full paging message is transmitted after delay of a paging gap time from the short paging message, the information processing system comprising:

a memory;

a processor, communicatively coupled to the memory; and a paging controller communicatively coupled to the memory and the processor, wherein the paging controller is adapted to:

setting a first paging gap time for a first address of the wireless device, the first address being mapped to a first function in the wireless device;

setting a second paging gap time for a second address of the wireless device, the second address being mapped to a second function in the wireless device;

updating the first paging gap time associated with the first address of the wireless device; and updating the second paging gap time associated with the second address of the wireless device, the second gap time being different than the first gap time.

14. The information processing system of claim 13, wherein the memory includes a page gap timing data base that includes a plurality of records corresponding to a respective plurality of addresses associated with the wireless device.

15. The information processing system of claim 14, wherein a first record of the plurality of records includes first page gap time setting criteria associated with the first address of the wireless device.

16. The information processing system of claim 15, wherein a second record of the plurality of records includes second page gap time setting criteria associated with the second address of the wireless device, the second page gap time setting criteria being different than the first page gap time setting criteria.

17. A wireless device capable of dynamically updating at least one paging gap time associated with at least one address of the wireless device in a two phase paging system included in a wireless communication system, wherein the two phase paging system comprises a first phase for transmitting a short paging message and a second phase for transmitting a full paging message wherein the full paging message is transmitted after delay of a paging gap time from the short paging message, the wireless device comprising:

a memory;

a processor, communicatively coupled to the memory; and a paging gap timing controller communicatively coupled to the memory and the processor, wherein the paging gap timing controller is adapted to:

in response to the wireless device receiving an update message including rule-based paging gap timing criteria, updating at least one gap time value in the memory according to the rule-based paging gap timing criteria.

18. A wireless device capable of dynamically updating at least one paging gap time associated with at least one address of the wireless device in a two phase paging system included in a wireless communication system, wherein the two phase paging system comprises a first phase for transmitting a short paging message and a second phase for transmitting a full paging message wherein the full paging message is transmitted after delay of a paging gap time from the short paging message, the wireless device comprising:

a memory for storing paging gap timing parameters corresponding to a plurality of addresses of the wireless device, the plurality of addresses being associated with a plurality of wireless communication functions of the wireless device, a first address of the plurality of addresses being associated with a first wireless communication function and with a first paging gap time and a second address of the plurality of addresses being associated with a second wireless communication function and with a second paging gap time;

a processor, communicatively coupled to the memory; and a paging gap timing controller communicatively coupled to the memory and the processor, wherein the paging gap timing controller is adapted to:

in response to the wireless device receiving at least one update message, updating at least one of the first paging gap time and the second paging gap time in the memory, the second paging gap time being different than the first paging gap time.

19. The wireless device of claim 18, wherein the first wireless communication function is a PTT function in the wireless device and the second wireless communication function is a telephony function in the wireless device, and wherein the first paging gap time is smaller than the second paging gap time.

* * * * *